(12) United States Patent
Tsao (10) Patent No.: US 7,610,491 B1
(45) Date of Patent: Oct. 27, 2009

(54) ACCOUNT RECOVERY KEY

(75) Inventor: Michael Tsao, San Mateo, CA (US)

(73) Assignee: Google Inc., Mountain View, CA (US)

( * ) Notice: Subject to any disclaimer, the term of this patent is extended or adjusted under 35 U.S.C. 154(b) by 838 days.

(21) Appl. No.: 11/095,311

(22) Filed: Mar. 31, 2005

(51) Int. Cl.
 *H04L 1/00* (2006.01)
(52) U.S. Cl. .................... 713/184; 713/182; 713/183
(58) Field of Classification Search ........... 713/184, 713/183, 182
See application file for complete search history.

(56) References Cited

OTHER PUBLICATIONS

Google version of http://docs.justia.com/cases/federal/district-courts/georgia/gandce/1:2004cv00864/28082/8/0.pdf. printed out in year 2008.*
Jun. 7, 2007; Google Developer Podcast Episode Three: Mike Tsao on Google Gears.*
Goodbye, Google. Hello, FSX, Mike Taso, printed out in year 2008.*
Eric Lippert (MSDN blog, Feb. 2005).*
Secured MyVirtualPDA using advanced encryption standard Taujuddin, N.S.A.; Noor, Z.M.; Tukiran, Z.; Wahab, M.H.A.; Mutalib, A.A.; Potentials, IEEE vol. 28, Issue 1, Jan.-Feb. 2009 pp. 40-42.*
Enhancing the Security of Intelligent Transportation Systems (ITS) using Iris/Finger-based Multimodal Biometrics Khan, M.B.; Khan, M.K.; Jiashu Zhang; Dianye Zhang; Engineering of Intelligent Systems, 2006 IEEE International Conference on pp. 1-6.*
Integration of user authentication and access control Harn, L.; Lin, H.-Y.; Computers and Digital Techniques, IEE Proceedings—vol. 139, Issue 2, Mar. 1992 pp. 139-143.*

* cited by examiner

*Primary Examiner*—David Y Jung
(74) *Attorney, Agent, or Firm*—Morgan, Lewis & Bockius LLP (57) ABSTRACT

Systems and methods generate an account recovery key for a protected system. The account recovery key may comprise a plurality of words that may be supplied to regain access to an account on a protected system if the account has been lost due to the actions of a malicious user or if the password to the account has been forgotten by the user.

25 Claims, 8 Drawing Sheets

ACCOUNT RECOVERY KEY

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Many computer applications and systems require a user to enter a password in order to access the application or system. Typically the user must have an account for the system or application. In addition to the password, the account typically has a user identifier associated with the account. For example, electronic mail systems and financial systems typically require a user to enter a user identifier and password in order for the user to access their email account.

While protecting account access with passwords is useful in restricting access to accounts to authorized persons, problems remain with password protected systems. A first problem is that users often forget their password. In order for an account to be secure, the user must choose or be assigned a password that is hard for an unauthorized user to guess. Unfortunately, a password that is hard to guess may also be a password that is hard for a user to remember.

A second problem is that a user's account may be hijacked, that is, an unauthorized user may obtain the authorized user's password (either by guessing or by otherwise learning the password), log in to the user's account, and change the password. The result is that the authorized user may no longer access their account because the new password is only known by the hijacker.

In addition to the problems created for a user when their account password is forgotten or hijacked, the owner or operator of the protected system incurs increased support costs, because the user must typically interact with support staff in order to regain access to their account. For example, support staff typically attempts to authenticate that the person seeking access to an account is the legitimate account holder, and not an imposter attempting to gain unauthorized access to an account. A common method of authentication is to ask the person seeking access questions such as "what is your city of birth", or "what is your mother's maiden name." However, answers to these types of questions may be relatively easy to obtain, even easier than attempting to guess the password in the first place. Thus, authentication methods typically in use in previous systems may impose significant support staff cost for relatively little security benefit.

In view of the above problems and issues, there is a need in the art for the present invention.

DETAILED DESCRIPTION

In the following detailed description, reference is made to the accompanying drawings that form a part hereof, and in which is shown by way of illustration, specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

In the Figures, the same reference number is used throughout to refer to an identical component which appears in multiple Figures. Signals and connections may be referred to by the same reference number or label, and the actual meaning will be clear from its use in the context of the description.

The functions or algorithms described herein are implemented in hardware, and/or software in embodiments. The software comprises computer executable instructions stored on computer readable media such as memory or other types of storage devices. The term "computer readable media" is also used to represent software-transmitted carrier waves. Further, such functions correspond to modules, which are software, hardware, firmware, or any combination thereof. Multiple functions are performed in one or more modules as desired, and the embodiments described are merely examples. A digital signal processor, ASIC, microprocessor, or any other type of processor operating on a system, such as a personal computer, server, a router, or any other device capable of processing data including network interconnection devices executes the software.

Some embodiments implement the functions in two or more specific interconnected hardware modules or devices with related control and data signals communicated between and through the modules, or as portions of an application-specific integrated circuit. Thus, the example process flow is applicable to software, firmware, and hardware implementations.

System Overview

Figure 1:
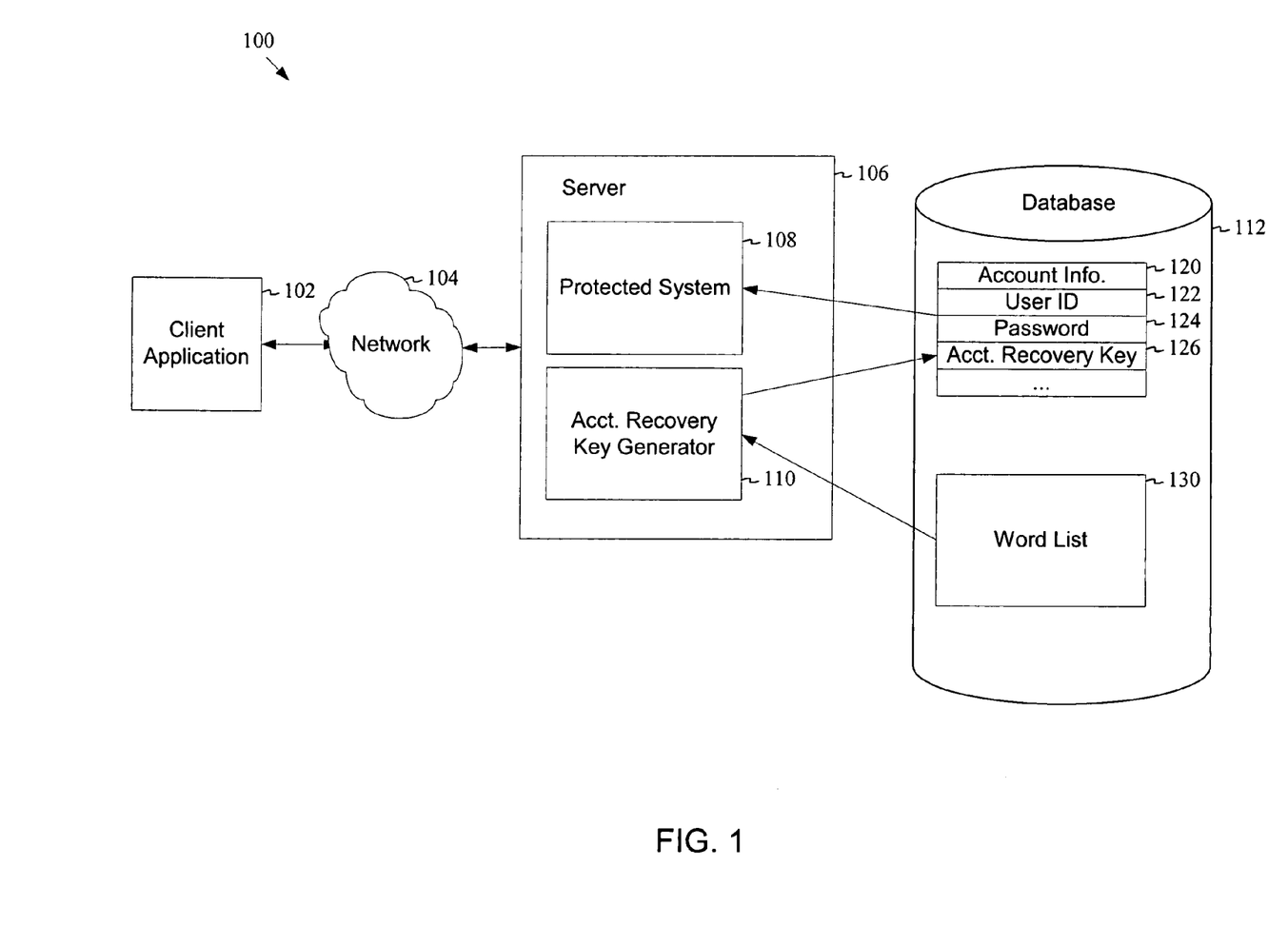
FIG. 1 is a block diagram illustrating a system incorporating embodiments of the invention.

FIG. 1 is a block diagram illustrating a system 100 incorporating embodiments of the invention. In some embodiments, system 100 includes a protected system 108 running on a server 106. Server 106 may also include an account recovery key generator 110 and a database 112. Users may access protected system 108 using a client application 102 through a network 104 communicably coupling server 106 and client application 102. The network may be any type of wired or wireless network, including local area networks, wide area networks, corporate intranets and the like. In some embodiments, network 104 comprises the Internet. Although illustrated as a client/server configuration in FIG. 1, the system may also be a middleware, three-tier or multiple tier architecture.

Protected system 108 may be any type of system in which some aspect of access to the system is restricted to authorized individuals. Examples of such systems include email (electronic mail) systems, financial systems, fee based service systems, subscription based systems or any other system in which access may be restricted or limited.

Client application 102 may be any type of application configured to operate with a protected system 108 on a computer system such as server 106. For example, in the case of an email system, client application 102 may be an email client configured to provide a user a means to send email messages to other users and view email messages sent to the user's account. Client application 102 may be a browser client such as a world wide web browser configured to view web pages provided by a web services based system.

Database 112 maintains account information 120 about the users of protected system 108. This information may include user ID (user identification) 122, password 124 (typically encrypted) and account recovery key 126.

Word list 130 is a set of words. The words may be randomly selected from a source such as a dictionary. In some embodiments, the words in word list 130 are processed to remove words that sound alike (homophones). Further, in some embodiments slang terms or potentially offensive terms are not included in word list 130. In the embodiments represented by FIG. 1, word list 130 is maintained in database 112. In alternative embodiments, word list 130 may be a file in a file system or other mechanism suitable for storing a word list. Further, in various embodiments multiple word lists may be used. Additionally, the word list may contain tokens other than words. For example, word list 130 may include numbers. In some embodiments where word list 130 includes numbers, the word list may be filtered so that numbers that look like words are not present in word list 130. For example, the number "100" may resemble the word "loo" and therefore the number 100 may be filtered from word list 130 in some embodiments.

In general, the system above operates as follows. A user ID and password are typically established when an account is initially created for a user on protected system 108. In addition, an account recovery key generator 110 generates an account recovery key for the user. In some embodiments, the account recovery key comprises a sequence of multiple words. Theses words may be obtained from one or more word lists 130. The account recovery key may be stored in an encrypted manner in database account info 120 or it may be stored as clear text. Account recovery key generator 110 may be a component of the protected system 108, or it may be separate service that may be used by multiple protected systems. Further details on the generation of account recovery keys will be provided below with reference to FIG. 3.

After the account has been created and the various account information portions established or generated, the user may utilize the account. Should the user forget details about their account, such as the password, or should the account be hijacked by a malicious user who changes the password thereby preventing the authorized user from gaining access to their account, the account recovery key may be used to restore the authorized user's access to the account. Further details on recovering access using an account recovery key are provided below with reference to FIG. 5.

It should be noted that the components depicted as operating on server 106 may in fact be distributed across multiple servers and need not be collocated on a single server.

Figure 2:
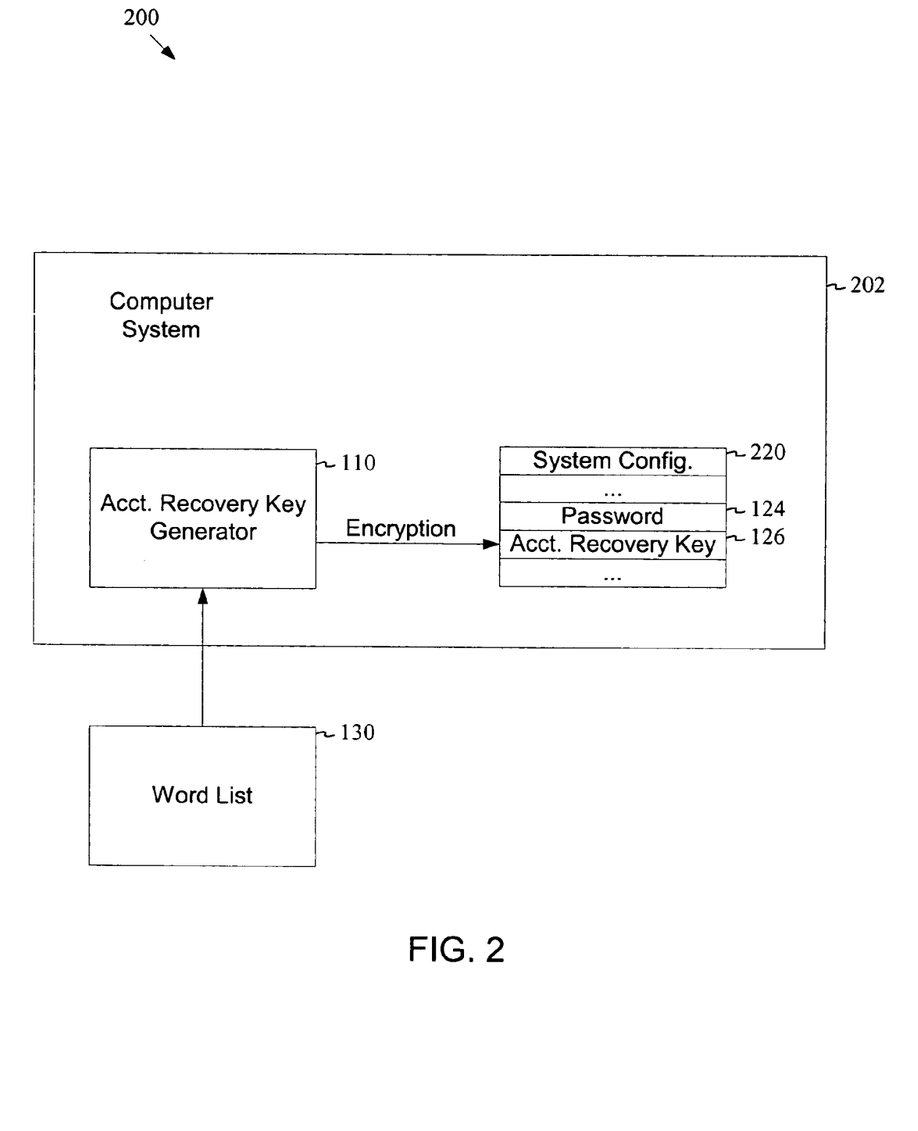
FIG. 2 is a block diagram illustrating a system according to alternative embodiments of the invention.

FIG. 2 is a block diagram illustrating a system 200 according to alternative embodiments of the invention. Like system 100, system 200 includes an account recovery key generator 110. However, in the embodiments represented by system 200, the protected system comprises a single system such as a personal computer, laptop computer, tablet computer, handheld computer, PDA (Personal Digital Assistant) and the like. In addition, the protected system may comprise a single non-server based application. In these embodiments, a user may establish a password to protect the system from outside users who might gain access to the system. For example, many laptop systems provide a means for a user to password protect the laptop. In these embodiments, the user establishes a password at some point during the configuration of the system. In addition, an account recovery key is generated by an account recovery key generator 110. The account recovery key may be encrypted using a one-way encryption mechanism to prevent a malicious user from scanning the configuration memory 220 for the account recovery key.

Example Processes

Figure 3:
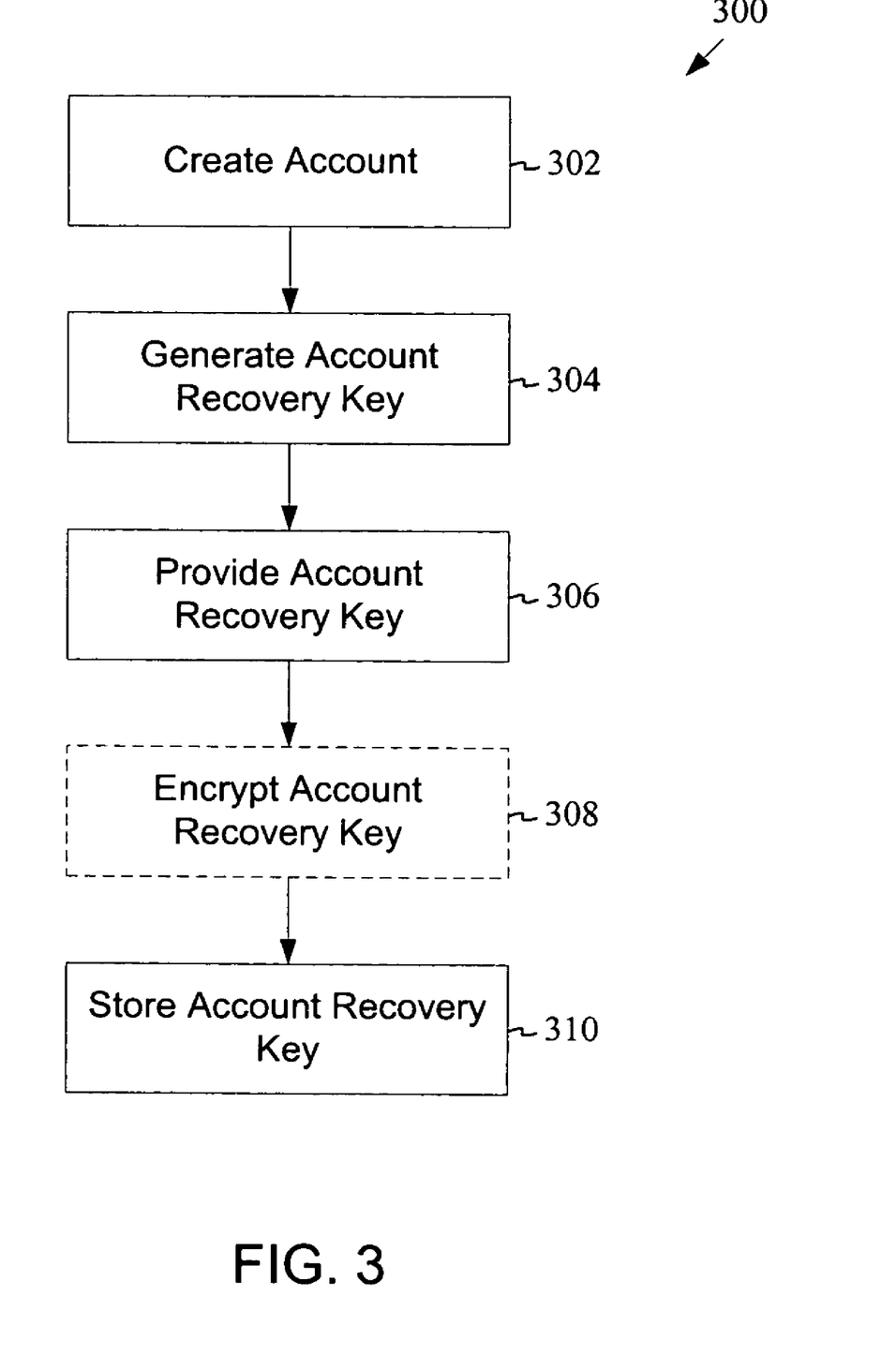
FIG. 3 illustrates a flow diagram of a method for providing an account recovery key according to embodiments of the invention.

FIG. 3 illustrates a flow diagram of methods for providing an account recovery key according to embodiments of the invention. The methods to be performed by the operating environment constitute computer programs made up of computer-executable instructions. Describing the methods by reference to a flowchart enables one skilled in the art to develop such programs including such instructions to carry out the methods on suitable computers (the processor or processors of the computer executing the instructions from computer-readable media such as ROMs, RAMs, hard drives, CD-ROM, DVD-ROM, flash memory etc.) The methods illustrated in FIG. 3 are inclusive of acts that may be taken by an operating environment executing an example embodiment of the invention.

The method begins by creating an account on a protected system (block 302). The account creation may be user initiated, or it may be initiated by a protected system. Further, the account creation may involve user identification and password creation, or it may involve password creation.

Next, the system generates an account recovery key (block 304). In some embodiments, generation of an account recovery key starts with the generation of a random number by a random number generator (also sometimes referred to as a pseudorandom number generator). The random number is then mapped into multiple subkeys, one component for each word that is to be used for the account recovery key.

Figure 4:
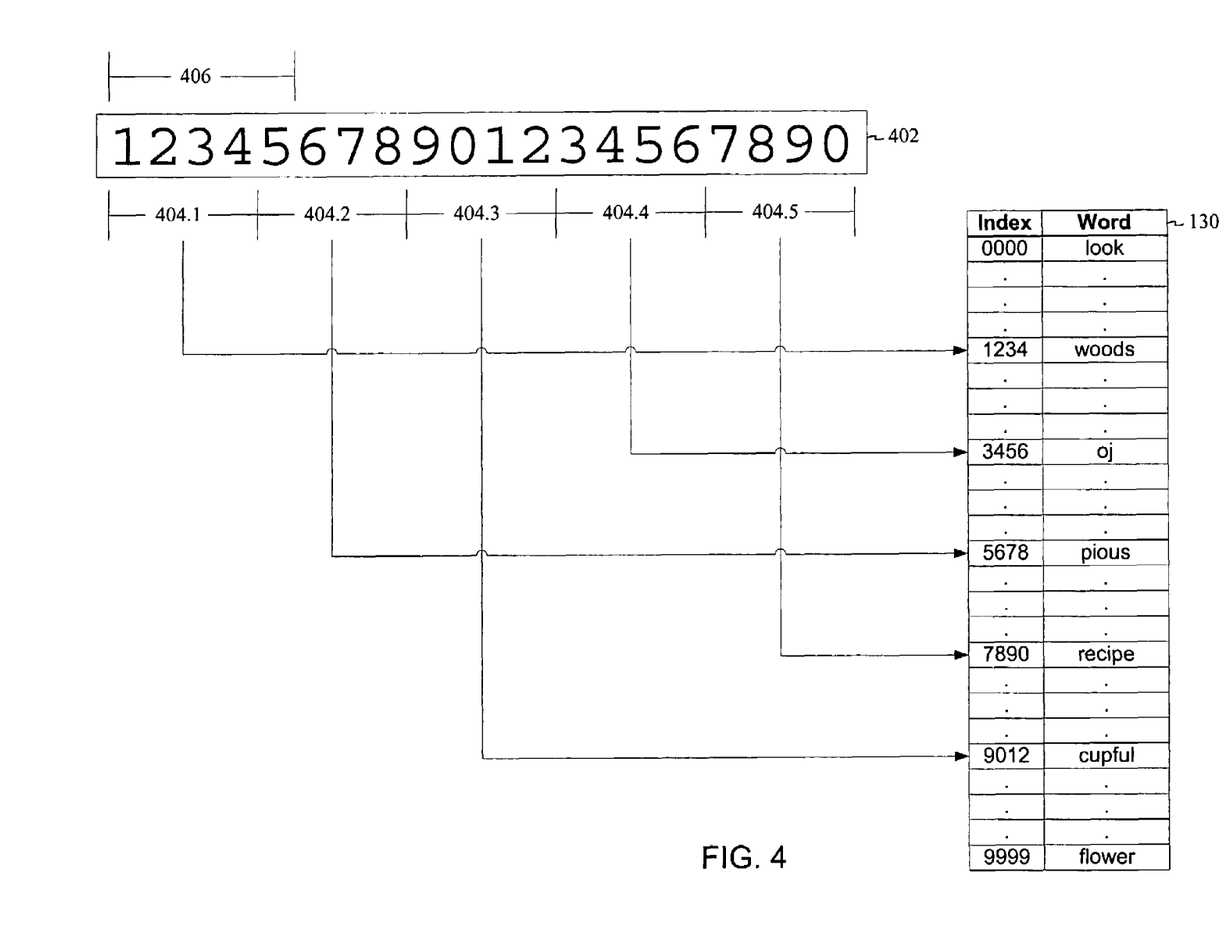
FIG. 4 is a diagram illustrating mapping a subkey of an account recovery key according to embodiments of the invention.

FIG. 4 is a diagram illustrating mapping a subkey of an account recovery key according to embodiments of the invention. In some embodiments, random number 402 is segmented into a number of components, one component for each word to be used in the account recovery key. In the example shown in FIG. 4, the account recovery key comprises five words and the random number is segmented into five subkeys, 404.1-404.5. Each of these subkeys may then be used as an index into a word list 130. The size of word list 130 in some embodiments corresponds to the size of the subkey that is segmented from random number 402.

In alternative embodiments, the random number may be segmented into more or fewer subkeys. For example, subkey 406 is a larger subkey than subkeys 404. In these embodiments, fewer subkeys may be segmented from the random number, however the larger subkey may be used as an index into a longer list of words. Conversely, a smaller subkey may be used as an index into a correspondingly smaller list of words.

In some embodiments, a single word list may be used, and each subkey is used as an index into the word list. In alternative embodiments, multiple word lists may be used, with each subkey used as an index into a differing word list from the other subkeys.

Further, in some embodiments, multiple random numbers may be generated, one for each subkey. In these embodiments, segmenting a single random number is not used, rather the account recovery key comprises each of the randomly generated subkeys. Each of these subkeys may then be used as an index into a word list or multiple word lists as described above.

Returning to FIG. 3, the account recovery key comprising the words generated at block 304 are provided (block 306). In some embodiments, the account recovery key is presented on a user interface screen. For example, if an HTML based user interface is used, the account recovery key may be provided on a web page. An example user interface is described below with reference to FIG. 6A. In alternative embodiments, the account recovery key may be electronically mailed to a user, mailed through a postal system, or faxed to a user.

In some embodiments, the account recovery key may be encrypted (block 308). Various mechanisms for encryption are known in the art and within the scope of the inventive subject matter. In some embodiments, a one-way encryption mechanism may be used. Encryption may be utilized when the user account data may not be secure. For example, if the account recovery key is used on a portable computing system such as a laptop, PDA or cell phone, the account recovery key may be determined by a malicious user if not encrypted. In these environments, it is desirable to encrypt the account recovery key prior to storage.

Next, the account recovery key is stored in a persistent data storage (block 310). In some embodiments, the persistent data storage may be a database used to store account details for a protected system. In alternative embodiments, the persistent data storage may be a persistent memory on a computer system such as a battery backed memory, a flash memory, a hard drive or other persistent memory.

It should be noted that in some embodiments, once the account recovery key is generated and stored, it remains unchanged for the life of the account associated with the account recovery key. This is desirable, because if an interface is provided to change the account recovery key, a malicious user could use the interface to change the account recovery key thereby preventing the legitimate user from recovering access to the account.

Figure 5:
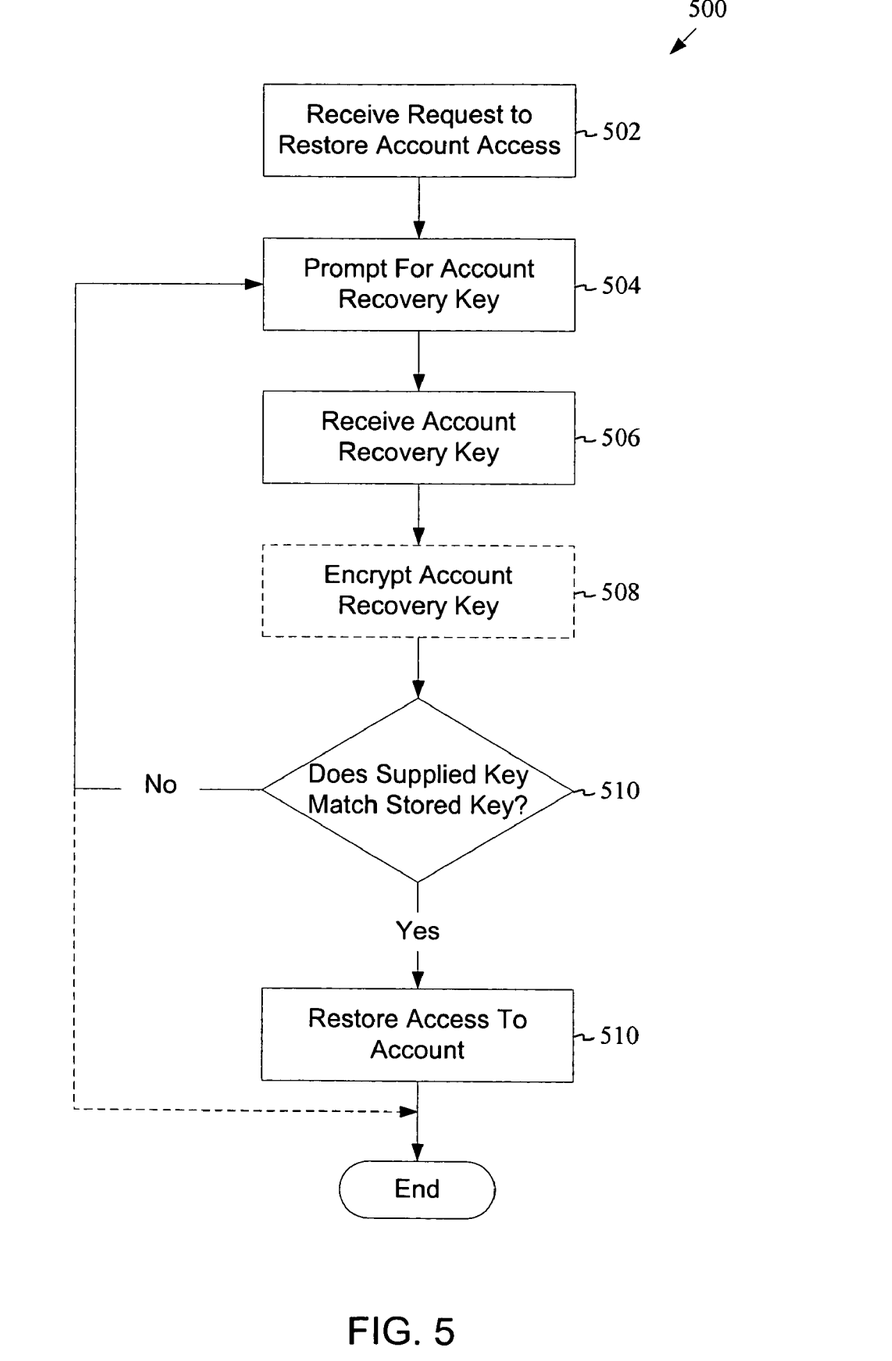
FIG. 5 illustrates a flow diagram of a method for restoring account access using an account recovery key according to embodiments of the invention.

FIG. 5 illustrates a flow diagram of a method for restoring account access using an account recovery key according to embodiments of the invention. The method begins by receiving a request to restore account access (block 502). In some embodiments, the request may be received through a user interface such as a HTML web based interface. In response to the request, the system provides an interface to enter the account recovery key (block 504). A sample user interface for entering an account recovery key is provided in FIG. 6B.

The system then receives the account recovery key (block 506). In some embodiments, an account identifier may be provided in addition to the words comprising the account recovery key. In alternative embodiments, the account identifier may be provided on a separate screen or interface.

In some embodiments, the account recovery key provided by the user is encrypted (block 508). In these embodiments, the encryption used corresponds to an original encryption mechanism that was used when the account recovery key was initially generated as discussed above.

The account recovery key supplied at block 506 is then compared to determine if it matches the stored account recovery key (block 510). In some embodiments, of the supplied account recovery key and the stored account recovery key do not match, the system returns to block 504 to prompt the user to re-enter an account recovery key. The system may impose limits on the number of times a user is allowed to attempt to enter an account recovery key for an account.

If the supplied account recovery key and the stored account recovery key match, the system then restores access to the account associated with the account recovery key (block 510). In other words, the system allows the user to access their account as if the proper password had been provided. The system may then provide an interface, or the user may select an interface, allowing the user to change the password away from the previous password that was forgotten or illegitimately changed.

Example Implementation

Figure 6A:
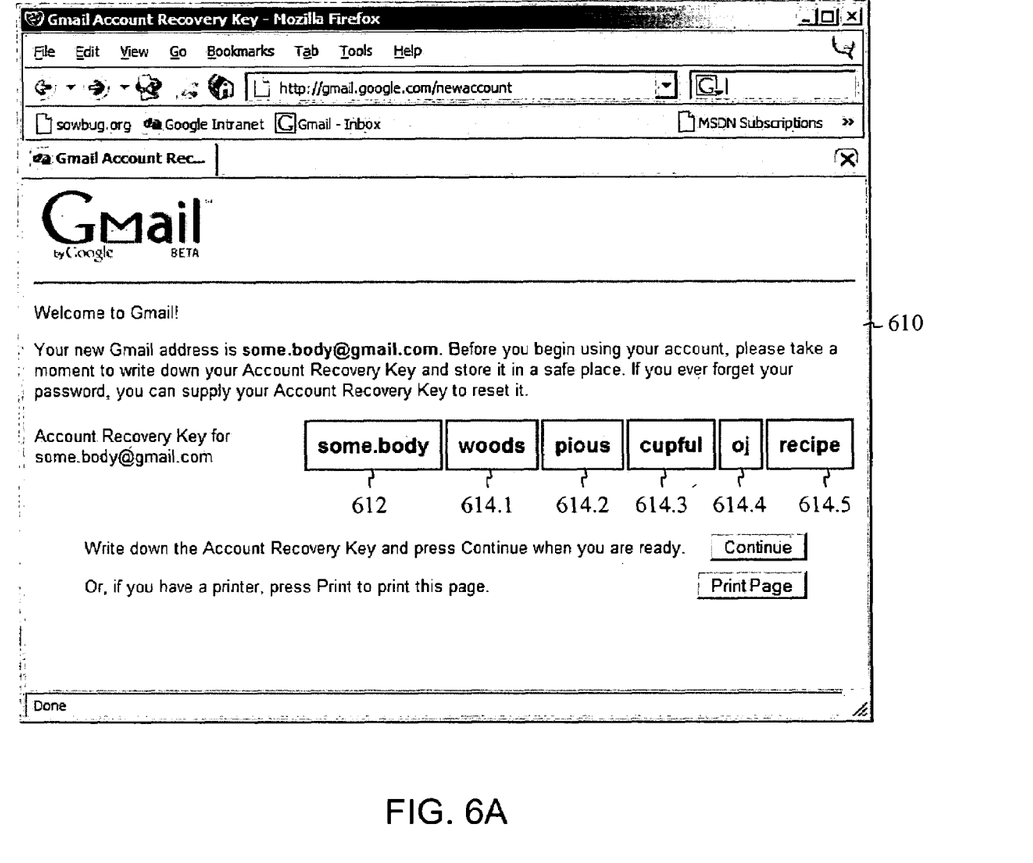
FIGS. 6A-6C are example screens used in embodiments of the invention.
Figure 6B:
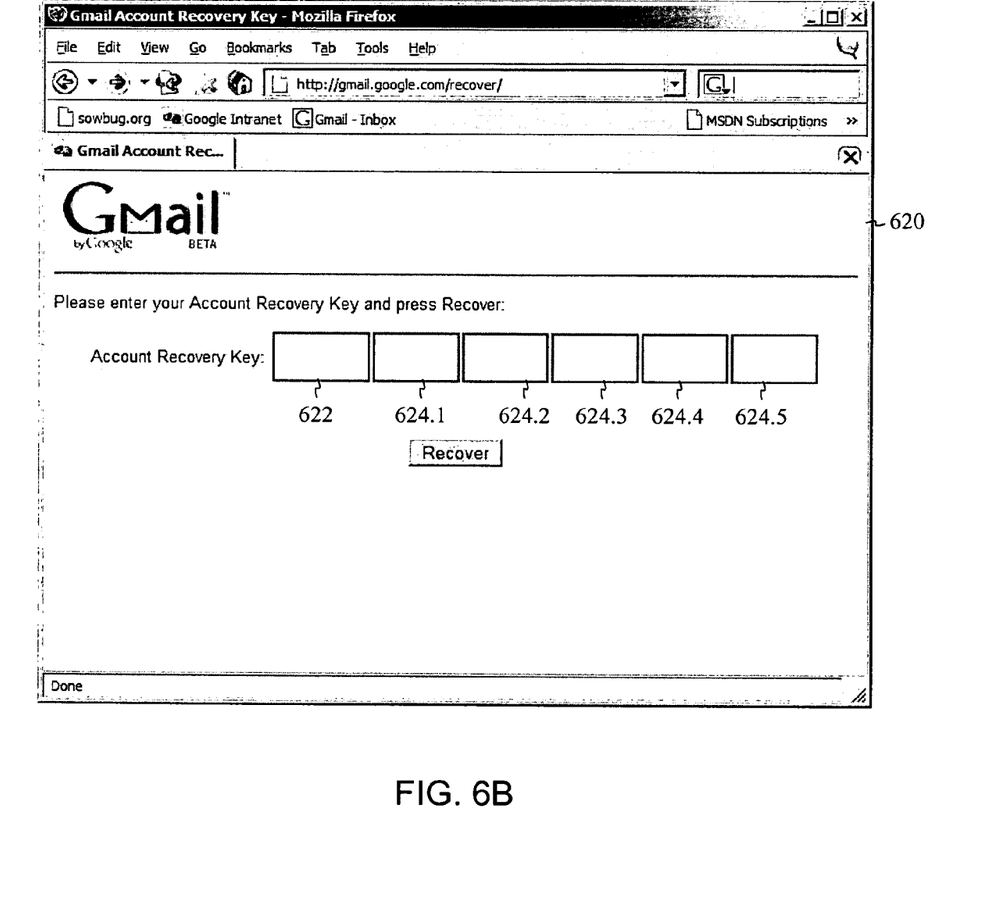
Figure 6C:
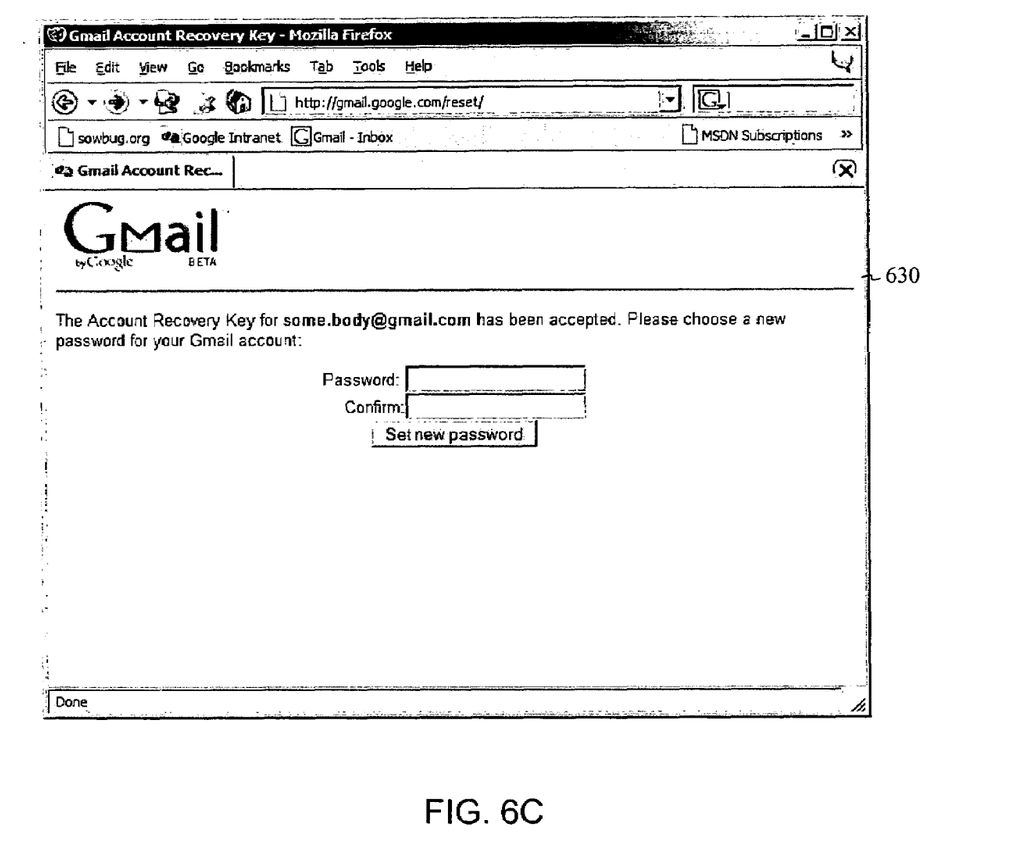

FIGS. 6A-6C are example screens used in embodiments of the invention. FIG. 6A illustrates an example screen 610 that provides an account recovery key to an account holder after it has been generated. The example screen includes an account identifier field 612 and account recovery key fields 614.1-614.5. In the example illustrated by screen 610, the account recovery key comprises five words selected as described above with reference to FIGS. 3 and 4. In alternative embodiments, the account recovery key may comprise more or fewer words.

FIG. 6B illustrates an example screen 620 that prompts an account holder to provide an account recovery key to restore access to the account. The example screen includes an account identifier input field 622 and account recovery key input fields 624.1-624.5. Upon entering the requested information, the user presses the recovery key in order to regain access to the system or account.

FIG. 6C illustrates an example password change screen 630 that may be displayed after the account recovery key has been validated. The password change screen 630 allows a user to reset the password after it has been forgotten or improperly changed. In some embodiments, the password may be changed, however the account recovery key remains invariant over the life of the account.

CONCLUSION

The illustrations of embodiments described herein are intended to provide a general understanding of the structure of various embodiments, and they are not intended to serve as a complete description of all the elements and features of apparatus and systems that might make use of the structures described herein. The accompanying drawings that form a part hereof show by way of illustration, and not of limitation, specific embodiments in which the subject matter may be practiced.

Applications that may include the apparatus and systems of various embodiments broadly include a variety of electronic and computer systems. The elements, materials, geometries, dimensions, and sequence of operations can all be varied to suit particular packaging requirements.

Embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract is provided to comply with 37 C.F.R. § 1.72(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of embodiments herein may be made without departing from the principles and scope of embodiments as expressed in the subjoined claims.

What is claimed is:

1. A computer-implemented method to recover an account, comprising:
   at a server,
      receiving a request from a client to restore access to an account on a protected system, wherein the account has a user identifier, a password, and an account recovery key, and the account recovery key is distinct from the user identifier and the password;
      providing a prompt to the client to enter an account recovery key;
      receiving the entered account recovery key from the client;
      comparing the entered account recovery key to a stored account recovery key, the stored account recovery key associated with the account and remaining invariant while associated with the account; and
      granting the client access to the protected system if the entered account recovery key matches the stored account recovery key.

2. The computer-implemented method of claim 1, wherein the stored account recovery key comprises a plurality of subkeys.

3. The computer-implemented method of claim 2, wherein each subkey comprises a word.

4. The computer-implemented method of claim 1, wherein the stored account recovery key comprises an encrypted stored account recovery key and wherein comparing the entered account recovery key to the stored account recovery key further comprises encrypting the entered account recovery key prior to the comparison.

5. The computer-implemented method of claim 1, wherein the protected system comprises an electronic mail system.

6. A computer program product for recovering an account, comprising:
   a computer-readable storage medium storing one or more programs for execution by one or more processors on a server, the one or more programs comprising:
      instructions, which, when executed, receive a request from a client to restore access to an account on a protected system, wherein the account has a user identifier, a password, and an account recovery key, and the account recovery key is distinct from the user identifier and the password;
      instructions, which, when executed, provide a prompt to the client to enter an account recovery key;
      instructions, which, when executed, receive the entered account recovery key from the client;
      instructions, which, when executed, compare the entered account recovery key to a stored account recovery key, the stored account recovery key associated with the account and remaining invariant while associated with the account; and
      instructions, which, when executed, grant the client access to the protected system if the entered account recovery key matches the stored account recovery key.

7. The computer program product of claim 6, wherein the stored account recovery key comprises a plurality of subkeys.

8. The computer program product of claim 7, wherein each subkey comprises a word.

9. The computer program product of claim 6, wherein the stored account recovery key comprises an encrypted stored account recovery key and wherein comparing the entered account recovery key to the stored account recovery key further comprises encrypting the entered account recovery key prior to the comparison.

10. The computer program product of claim 6, wherein the protected system comprises an electronic mail system.

11. A computer-implemented method for providing account recovery, comprising:
   at a server,
      receiving a request from a client to establish an account that provides access to a protected application;
      creating an account for the client, including a user identifier and a password;
      generating an account recovery key for the account that is invariant and is distinct from the user identifier and password;
      transmitting the account recovery key to the client;
      wherein the client will be granted access to the protected application if the client provides the user identifier and the password or if the client provides the user identifier and the account recovery key.

12. The computer-implemented method of claim 11, wherein the account recovery key comprises a plurality of subkeys.

13. The computer-implemented method of claim 12, wherein each of the plurality of subkeys comprises a word.

14. The computer-implemented method of claim 13, wherein the plurality of subkeys is determined by generating a random number for each subkey and using each random number as an index into a list of words.

15. The computer-implemented method of claim 11, wherein the protected application is an electronic mail system.

16. A computer program product for providing account recovery, comprising:
   a computer readable storage medium storing one or more programs for execution by one or more processors on a server, the one or more programs comprising:
      instructions, which, when executed, receive a request from a client to establish an account that provides access to a protected application;
      instructions, which, when executed, create an account for the client, including a user identifier and a password;

instructions, which, when executed, generate an account recovery key for the account that is invariant and is distinct from the user identifier and password;

instructions, which, when executed, transmit the account recovery key to the client;

wherein the client will be granted access to the protected application if the client provides the user identifier and the password or if the client provides the user identifier and the account recovery key.

17. The computer program product of claim 16, wherein the account recovery key comprises a plurality of subkeys.

18. The computer program product of claim 17, wherein each of the plurality of subkeys comprises a word.

19. The computer program product of claim 18, wherein the plurality of subkeys is determined by generating a random number for each subkey and using each random number as an index into a list of words.

20. The computer program product of claim 16, wherein the protected application is an electronic mail system.

21. A server computer for providing account recovery, comprising:

a main memory;

one or more processors with cache memory; and one or more programs for providing access to a protected application and for providing account recovery, wherein the one or more programs are stored in the main memory and are executed by the one or more processors, the one or more programs including:

instructions, which, when executed, receive a request from a client to establish an account that provides access to a protected application;

instructions, which, when executed, create an account for the client, including a user identifier and a password;

instructions, which, when executed, generate an account recovery key for the account that is invariant and is distinct from the user identifier and password;

instructions, which, when executed, transmit the account recovery key to the client;

wherein the client will be granted access to the protected application if the client provides the user identifier and the password or if the client provides the user identifier and the account recovery key.

22. The server computer of claim 21, wherein the account recovery key comprises a plurality of subkeys.

23. The server computer of claim 22, wherein each of the plurality of subkeys comprises a word.

24. The server computer of claim 23, wherein the plurality of subkeys is determined by generating a random number for each subkey and using each random number as an index into a list of words.

25. The server computer of claim 21, wherein the protected application is an electronic mail system.

* * * * *

UNITED STATES PATENT AND TRADEMARK OFFICE
CERTIFICATE OF CORRECTION

PATENT NO. : 7,610,491 B1  
APPLICATION NO. : 11/095311  
DATED : October 27, 2009  
INVENTOR(S) : Michael Tsao It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1245 days.

Signed and Sealed this

Twelfth Day of October, 2010

David J. Kappos  
*Director of the United States Patent and Trademark Office*